United States Patent
Pilkington

(10) Patent No.: US 10,812,355 B2
(45) Date of Patent: Oct. 20, 2020

(54) RECORD COMPRESSION FOR A MESSAGE SYSTEM

(71) Applicant: International Business Machines Corporation, Armonk, NY (US)

(72) Inventor: Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/135,725

(22) Filed: Sep. 19, 2018

(65) Prior Publication Data
US 2020/0092183 A1    Mar. 19, 2020

(51) Int. Cl.
  *H04L 12/26* (2006.01)
  *H04L 12/58* (2006.01)
  *H04L 29/08* (2006.01)

(52) U.S. Cl.
  CPC .......... *H04L 43/067* (2013.01); *H04L 43/04* (2013.01); *H04L 51/16* (2013.01); *H04L 51/28* (2013.01); *H04L 51/30* (2013.01); *H04L 67/2842* (2013.01)

(58) Field of Classification Search
  CPC ....... H04L 43/067; H04L 51/16; H04L 51/28; H04L 67/2842; H04L 43/04; H04L 51/30
  See application file for complete search history.

(56) References Cited

U.S. PATENT DOCUMENTS

| | | | |
|---|---|---|---|
| 8,806,611 B2 | 8/2014 | Saroj et al. | |
| 8,959,530 B1 | 2/2015 | Leonard | |
| 9,674,127 B2 | 6/2017 | Kesavan et al. | |
| 10,019,340 B2 | 7/2018 | Nicol et al. | |
| 2008/0155693 A1 | 6/2008 | Mikan et al. | |
| 2013/0333028 A1 | 12/2013 | Hagar et al. | |
| 2015/0381511 A1 | 12/2015 | Word | |
| 2017/0064027 A1 | 3/2017 | Grenader | |
| 2017/0223046 A1 | 8/2017 | Singh | |
| 2017/0295119 A1 | 10/2017 | Rosenberg et al. | |
| 2017/0310628 A1* | 10/2017 | Norwood | H04L 51/18 |

(Continued)

FOREIGN PATENT DOCUMENTS

| | | |
|---|---|---|
| CN | 107038162 A | 8/2017 |
| EP | 1462941 B1 | 4/2015 |

OTHER PUBLICATIONS

Grujic, "Surviving poison messages in MSMQ," CodeProject, copyright 2005, accessed Aug. 18, 2018, 11 pages. https://www.codeproject.com/articles/10841/surviving-poison-messages-in-MSMQ.

(Continued)

*Primary Examiner* — Caroline H Jahnige
(74) *Attorney, Agent, or Firm* — Yee & Associates, P.C.

(57) ABSTRACT

A method, apparatus, system, and computer program product for processing messages for a messaging system. A client identifier in a request received from a client is replaced with a system identifier. The request is sent to the messaging system. A record is received from the messaging system in response to sending the request to the messaging system. The record comprises a record and a time stamp. The record is placed into a time slot based on the time stamp for the record. The record is combined with a number of records in the time slot that have adjacent ranges with the record. A set of records in the time slot is sent to an analysis system to identify message metrics.

17 Claims, 9 Drawing Sheets

(56) References Cited

U.S. PATENT DOCUMENTS

2018/0048741 A1    2/2018  Shcherbakov et al.
2018/0060143 A1*  3/2018  Uttamchandani ....... G06F 16/27
2018/0167476 A1*  6/2018  Hoffner ................... H04L 67/26
2020/0092236 A1    3/2020  Hawker et al.

OTHER PUBLICATIONS

ByAlexBlog, "RabbitMQ poisoned messages handeling," Feb. 9, 2016, accessed Aug. 18, 2018, 13 pages. https://byalexblog.net/rabbitmq-poisoned-messages-handeling.

Mansour et al., "I-RMI: Performance Isolation in Information Flow Applications," IFIP International Federation for Information Processing, Lecture Notes in Computer Science, vol. 3790, Springer, Berlin, Heidelberg, 2005, pp. 377-391.

List of IBM Patents or Applications Treated As Related, 2 pages.

Notice of Allowance, dated Mar. 12, 2020, regarding U.S. Appl. No. 16/135,629, 17 pages.

* cited by examiner

RECORD COMPRESSION FOR A MESSAGE SYSTEM

BACKGROUND

1. Field

The disclosure relates generally to an improved computer system and, more specifically, to a method, apparatus, system, and computer program product for compressing messages in a messaging system.

2. Description of the Related Art

Messaging systems are used to support the receiving and sending of messages between producers of the messages and the consumers of the messages. These messaging systems are implemented in heterogeneous platforms as message-oriented middleware. Message-oriented middleware systems often employ a publisher subscriber pattern in which senders of the messages are publishers. These publishers do not send the messages directly to specific receivers, called subscribers, for consumers. Instead, the messages can be published in categories without knowledge of the subscribers.

Messaging systems have been employed to handle large streams of data originating from thousands of publishers. In some cases, a user may desire to see a rate at which messages pass through a messaging system. For example, a message flow through a messaging system can be millions of messages per second. The message flow also may not be steady. A user may desire to see the message flow to determine whether the messaging system is performing as desired. The user may view statistics on the message flow and selectively view the messages.

Currently, the messages are passed to an analysis system for analysis. Sending the messages to a system for analysis is resource intensive. For example, the use of network and processing resources can be extremely high and limits to these resources can be greater than available thus resulting in a bottleneck. The resources used can include at least one of network resources for sending the messages to the analysis system, processing the resources needed by the analysis system to index the messages, and other resources.

Therefore, it would be desirable to have a method and apparatus that take into account at least some of the issues discussed above, as well as other possible issues. For example, it would be desirable to have a method and apparatus that overcome a technical problem with monitoring message flow in a messaging system.

SUMMARY

According to one embodiment of the present invention, a method processes messages for a messaging system. A client identifier in a request received from a client is replaced by a computer system with a system identifier. The request is sent to the messaging system by the computer system. A response is received by the computer system from the messaging system in response to sending the request to the messaging system. The response comprises the system identifier and a record identifying a location and a number of messages at the location. The record is placed into a time slot in a plurality of time slots by the computer system based on a time stamp for the record. The record is combined by the computer system with a number of records in the time slot that have adjacent ranges with the record placed into the time slot. A set of records in the time slot is sent by the computer system to an analysis system to identify message metrics.

According to another embodiment of the present invention, a message processing system comprises a computer system. The computer system replaces a client identifier in a request received from a client with a system identifier and sends the request to a messaging system. The computer system receives a response from the messaging system in response to sending the request to the messaging system. The response comprises the system identifier and a record identifying a location and a number of messages at the location. The computer system places the record into a time slot in a plurality of time slots based on a time stamp for the record. The computer system combines the record with a number of records in the time slot that have adjacent ranges with the record placed into the time slot and sends a set of records in the time slot to an analysis system to identify message metrics.

According to yet another embodiment of the present invention, a computer program product for processing messages for a messaging system comprises a computer-readable-storage media, first program code, second program code, third program code, fourth program code, fifth program code, and sixth program code stored on the computer-readable storage media. The first program code is run to replace a client identifier in a request received from a client with a system identifier. The second program code is run to send the request to the messaging system. The third program code is run to receive a response the messaging system in response to sending the request to the messaging system. The response comprises the system identifier and a record identifying a location and a number of messages at the location. The fourth program code is run to place the record into a time slot in a plurality of time slots based on a time stamp for the record. The fifth program code is run to combine the record with a number of records in the time slot that have adjacent ranges with the record placed into the time slot to form a compressed record, wherein the compressed record is analyzed to identify message metrics.

DETAILED DESCRIPTION

Figure 1:
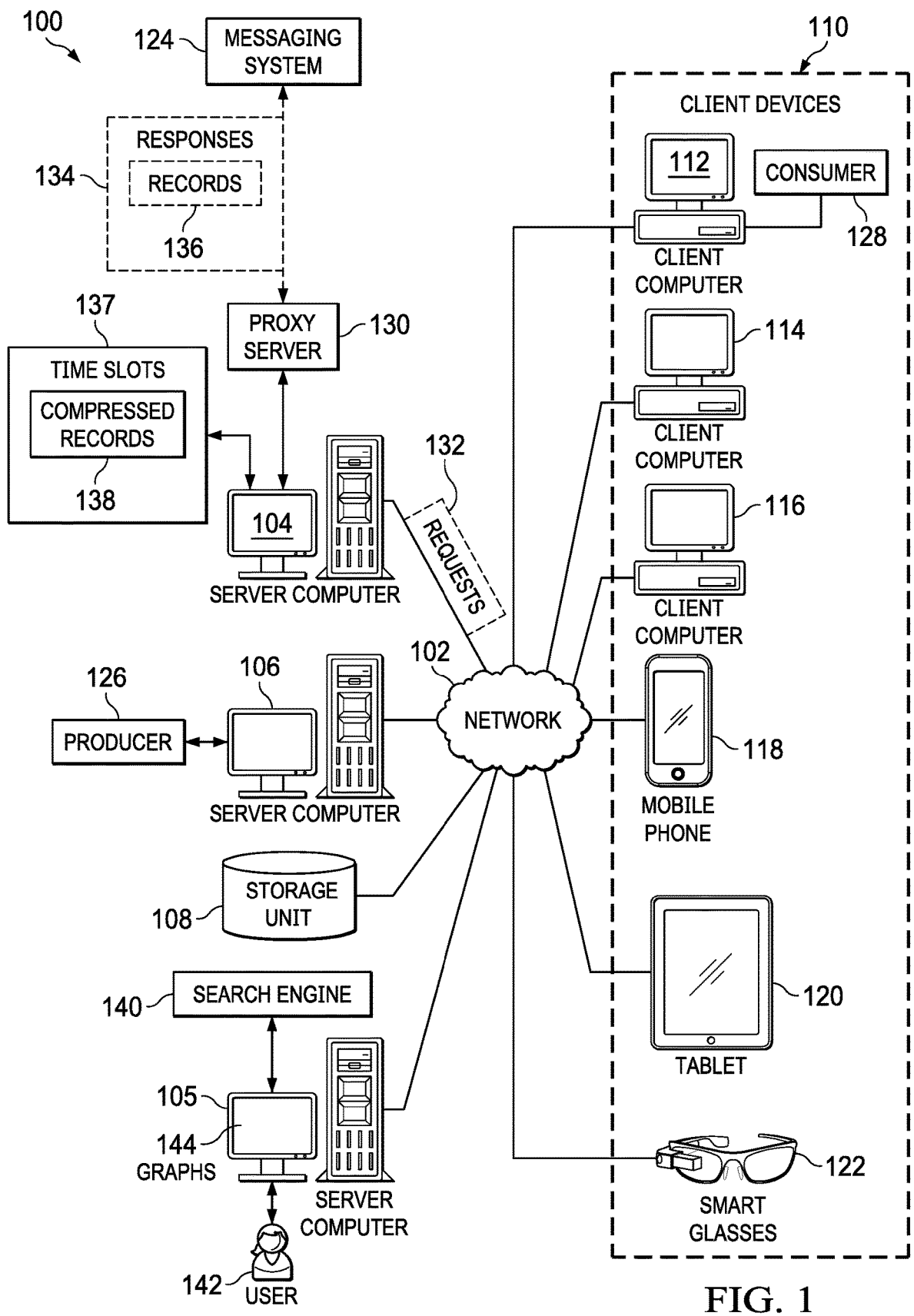
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that sending messages to an analysis system uses more resources that desired. The use of resources can be a bottle neck limiting an ability to analyze a message without an undesired backup of the message. The illustrative embodiments recognize and take into account that these resources include at least one of network and processing resources.

Thus, the illustrative embodiments provide a method, apparatus, system, and computer program product for processing messages for a messaging system. The processing includes generating data for use by an analysis system to analyze a message flow through the messaging system. In one illustrative example, a client identifier in a request received from a client is replaced by a computer system with a system identifier. The request is sent to the messaging system by the computer system. A response is received by the computer system from the messaging system in response to sending the request to the messaging system. The response comprises a system identifier and a record identifying a location and a number of messages at the location. The record is placed into a time slot in a plurality of time slots by the computer system based on a time stamp for the record. The record is combined by the computer system with a number of records in the time slot that have adjacent ranges with the record placed into the time slot. A set of records in the time slot is sent by the computer system to a remote computer system to identify message metrics. Compressing the records enables reducing processing resources used to process the records.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104, server computer 105, and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 105, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, messaging system 124 runs on server computer 104. In this illustrative example, messaging system 124 operates in a number of different ways. For example, messaging system 124 can operate using a publish and subscribe messaging pattern. For example, producer 126 is a software application running on server computer 106 which can distribute messages to client devices 110 without directly sending the messages to client devices 110.

In this illustrative example, producer 126 generates the messages for distribution. The messages can contain logs, video, news articles, temperature data, or other types of data that are sent to messaging system 124.

Software applications in client devices 110 can request messages from messaging system 124. These software applications are referred to as consumers of the messages distributed by messaging system 124. Consumer 128 is a software application running on client computer 112 and can receive messages generated by producer 126 from messaging system 124. As depicted, consumer 128 can request messages stored on messaging system 124 for particular topics.

Producer 126 is a client to messaging system 124 in which producer 126 sends requests with the messages to messaging system 124. Consumer 128 is also a client to messaging system 124 in which consumer 128 requests the messages that have been sent to messaging system 124 by producer 126.

In this illustrative example, proxy server 130 in server computer 104 intercepts requests from producer 126 to messaging system 124. Proxy server 130 receives requests 132 from producer 126 to publish the messages and sends requests 132 to messaging system 124. Proxy server 130 also receives responses 134 to requests 132 from messaging system 124 and returns responses 134 to producer 126. In other words, proxy server 130 is between producer 126 and messaging system 124.

In this illustrative example, proxy server 130 performs additional operations in addition to relaying requests 132 and responses 134. As depicted, proxy server 130 operates to process the messages received in requests 132 from producer 126 and process responses 134 returned by messaging system 124 in a manner that allows for analysis of the messages flowing through messaging system 124.

In the illustrative example, proxy server 130 replaces client identifiers in requests 132 received from the client, producer 126, with system identifiers. Further, if requests 132 do not ask for responses 134, requests 132 are altered to ask for these responses. After processing requests 132, proxy server 130 sends requests 132 to messaging system 124.

When responses 134 are received by proxy server 130 from messaging system 124, proxy server 130 determines whether producer 126 asked for responses 134. If producer 126 asked for responses 134, proxy server 130 restores the client identifiers and sends responses 134 to producer 126. If requests 132 from producer 126 did not ask for responses 134, responses 134 are not returned to producer 126.

As depicted, records 136 are in responses 134 and provide information for analyzing a flow of the messages in messaging system 124. In this illustrative example, records 136 in responses 134 include location information for the messages in requests 132. Records 136 are placed into time slots 137 based on timestamps for responses 134.

As depicted, proxy server 130 compresses records 136 placed into time slots 137 to form compressed records 138 when possible. In this example, compressed records 138 are sent to an analysis system, such as search engine 140 in server computer 105, for further processing and analysis. In this example, compressed records 138 can be indexed and analyzed by search engine 140. The results of the indexing can be used to display information to user 142. The information can be, for example, graphs 144 that depict a message flow though messaging system 124.

This display of the message flow using graphs 144 can be analyzed by user 142 to determine whether changes can be made to increase the performance of messaging system 124. The changes can include at least one of changing a network connection, adding a network link, adding memory, reconfiguring a router, changing the architecture of messaging system 124, or other changes that can increase the rate at which the messages are sent through messaging system 124. The message flow can then be examined over time and compared to a previous message flow to determine if an increase in performance has been achieved.

In other illustrative examples, graphs 144 can be used to examine the messages at different points in time. For example, user 142 may request portions of the messages during a time period in which the message flow is greater than a threshold.

As depicted, records 136 and compressed records 138 do not include the messages received in requests 132. By avoiding sending the messages from requests 132 to search engine 140, resources used to analyze the messages are reduced. For example, decreased network traffic is present when the messages are not sent to search engine 140. As another example, fewer processing resources are used by search engine 140 when the messages do not need to be processed. These processing resources include processor time, memory, storage, and other resources in server computer 105.

In the illustrative example in FIG. 1, the records generated for the analysis system does not include the messages. These records take less network resources to transmit over network 102 and less processor resources in server computer 104 to analyze.

The illustration of network data processing system 100 in FIG. 1 is not meant to limit the manner in which different illustrative examples can be implemented. For example, one or more producers in addition to producer 126 can be clients and send messages to messaging system 124. In yet another illustrative example, search engine 140 can run on server computer 104.

Figure 2:
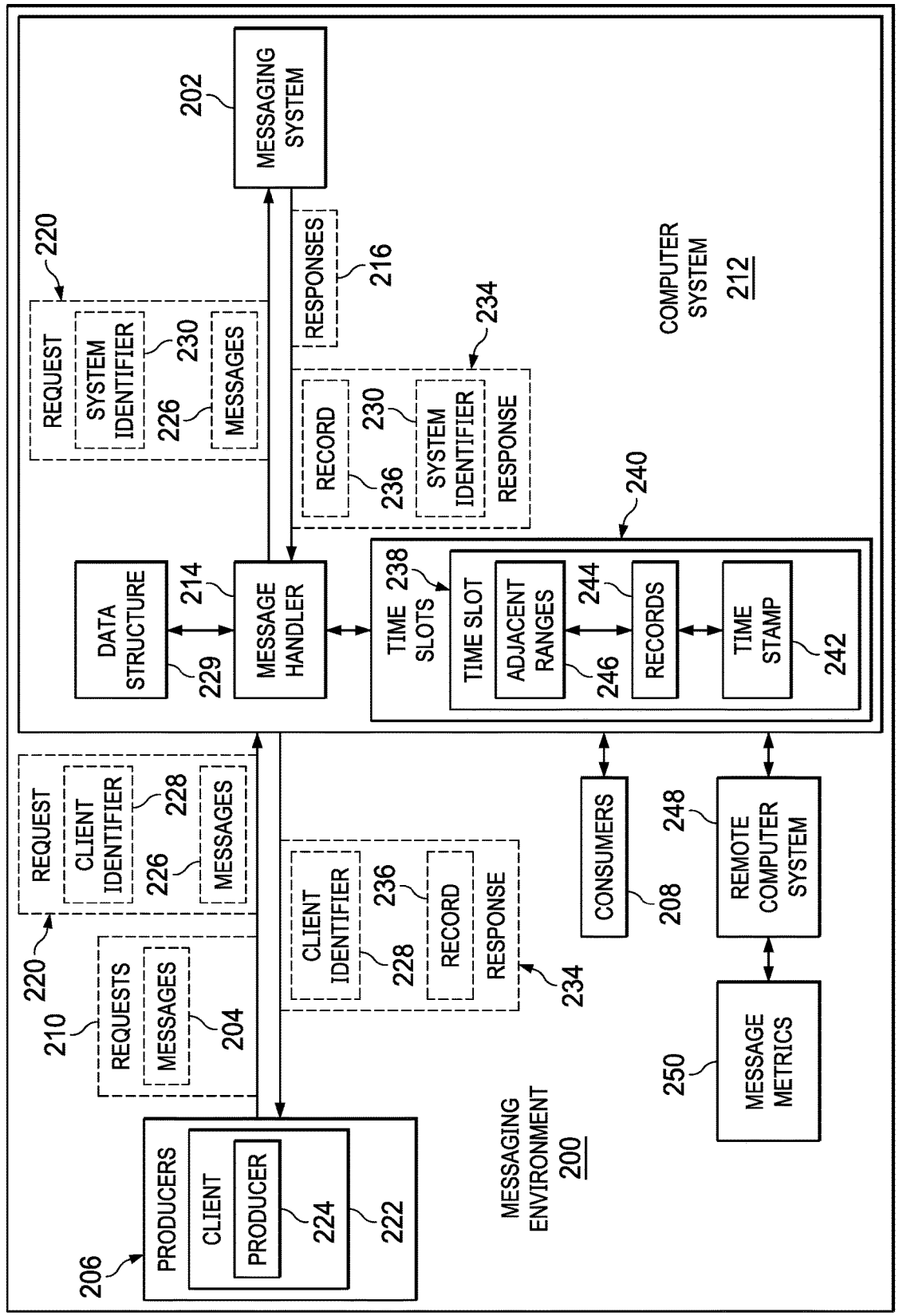
FIG. 2 is a block diagram of a messaging environment in accordance with an illustrative embodiment.

With reference now to FIG. 2, a block diagram of a messaging environment is depicted in accordance with an illustrative embodiment. In this illustrative example, messaging environment 200 includes components that can be implemented in hardware such as the hardware shown in network data processing system 100 in FIG. 1.

In this illustrative example, messaging system 202 in messaging environment 200 facilitates the distribution of messages 204 created by producers 206 to consumers 208. A producer is a software application that generates messages 204 that can be sent in requests 210 to messaging system 202. A consumer is a software application that receives messages 204 from messaging system 202.

As depicted, messaging system 202 runs on computer system 212 and is a software platform that can handle real-time data feeds. Messaging system 202 can be used to process streaming data. In one illustrative example, messaging system 202 can be a message broker such as Apache Kafka, Celery, Oracle Message Broker, or some other suitable platform.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a desktop computer, a work station, a tablet computer, or some other suitable data processing system.

In this illustrative example, message handler 214 in computer system 212 operates as an intermediary between producers 206 and messaging system 202. Message handler 214 also operates as an intermediary between consumers 208 and messaging system 202. In some illustrative examples, message handler 214 can be implemented as a proxy server for messaging system 202. In other illustrative examples, message handler 214 can be implemented as part of messaging system 202.

In this depicted example, message handler 214 receives responses 216 from messaging system 202 that are generated in response to messaging system 202 receiving requests 210. When producers 206 expect responses 216, message handler 214 sends responses 216 to producers 206.

As depicted, message handler 214 receives request 220 from client 222. In this example, client 222 is producer 224 in producers 206. In this example, request 220 includes a set of messages 226. As used herein, "a set of," when used with reference to items, means one or more items. For example, "a set of messages 226" is one or more of messages 226.

As depicted, message handler 214 replaces client identifier 228 in request 220 received from client 222 with system identifier 230. In this illustrative example, message handler 214 stores system identifier 230 in association with client identifier 228 in data structure 229. Data structure 229 provides a mechanism to associate client identifiers with system identifiers.

Further, an indication of whether a response has been requested can be stored in data structure 229 in association with client identifier 228 and system identifier 230. System identifier 230 can be used as an index to locate client identifier 228 and the indication of whether a response was requested.

In this example, data structure 229 can take a number of different forms. For example, data structure 229 can be selected from a group comprising a table, a linked list, a flat file, a database, or some other suitable type of data structure.

Further, message handler 214 determines whether client 222 asked for a response in request 220. If client 222 has not asked for a response in request 220, message handler 214 alters request 220 to cause a response to be generated by messaging system 202. Thereafter, message handler 214 sends request 220 with system identifier 230 to messaging system 202.

Message handler 214 receives response 234 from messaging system 202 in response to sending request 220 to messaging system 202. As depicted, response 234 comprises system identifier 230 and record 236 identifying a location and a number of messages at the location. In this example, the location is a location within message handler 214 where the messages in request 220 are stored. The number of messages at that location identify how many of the messages from requests 220 are stored at the location. For example, the location can be an offset to a storage location where the number of messages from request 220 is stored by messaging system 202 and a count identifying the number of messages is stored.

In this illustrative example, message handler 214 identifies client identifier 228 using system identifier 230 in record 236 when client 222 expects to receive response 234. Message handler 214 identifies the client identifier using data structure 229. As depicted, message handler 214 restores client identifier 228 in response 234 when client 222 expects to receive response 234. Thereafter, message handler 214 sends response 234 with client identifier 228 and record 236 to client 222.

As depicted, the replacement of system identifier 230 with client identifier 228 is omitted if client 222 did not request to receive response 234 in request 220. In this case, message handler 214 suppresses sending of response 234 to client 222 when response 234 is received from messaging system 202. Thus, response 234 is not returned to client 222 when an absence of a response being requested by the client is present in request 220.

In this illustrative example, message handler 214 places record 236 into time slot 238 in a plurality of time slots 240 based on time stamp 242 for record 236. As depicted, the plurality of time slots 240 can be located in an entry in a linked list of entries.

Further, message handler 214 combines record 236 with a number of records 244 in time slot 238 that have adjacent ranges 246 with record 236 placed into time slot 238. This type of combining compresses records 244 to reduce the amount of data that needs to be sent or processed. Message handler 214 sends a set of records 244 in time slot 238 to remote computer system 248 to identify message metrics 250. An analysis system can run on remote computer system 248 to identify message metrics. The analysis system may be a search engine or any other software application or process that is capable of analyzing records 244 of identify message metrics 250. In this illustrative example, compressing records 244 enables reducing processing resources used to process records 244 to identify message metrics 250.

Message handler 214 can be implemented in software, hardware, firmware, or a combination thereof. When software is used, the operations performed by message handler 214 can be implemented in program code configured to run on hardware, such as a processor unit. When firmware is used, the operations performed by message handler 214 can be implemented in program code and data and stored in persistent memory to run on a processor unit. When hardware is employed, the hardware may include circuits that operate to perform the operations in message handler 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with monitoring processing of a message such as message flow in messaging system 202. As a result, one or more technical solutions may provide a technical effect of reducing the amount of data processed to determine message metrics for the processing of messages in messaging system 202.

As a result, computer system 212 operates as a special purpose computer system in which message handler 214 in computer system 212 enables generating data for use in analyzing the processing of messages in messaging system 202 in a manner that is more efficient than current techniques. In particular, message handler 214 transforms computer system 212 into a special purpose computer system as compared to currently available general computer systems that do not have message handler 214.

The illustration of messaging environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, record 236 can also include other information in addition to a location and a number of messages in messaging system 202. For example, record 236 can further comprise at least one of a topic or a partition used to locate the number of messages stored by messaging system 202. In another example, the analysis system for identifying message metrics 205 can run on computer system 212 and even on the same computer in computer system 212 as message handler 214 or messaging system 202 instead of being located in remote computer system 248.

Figure 3:
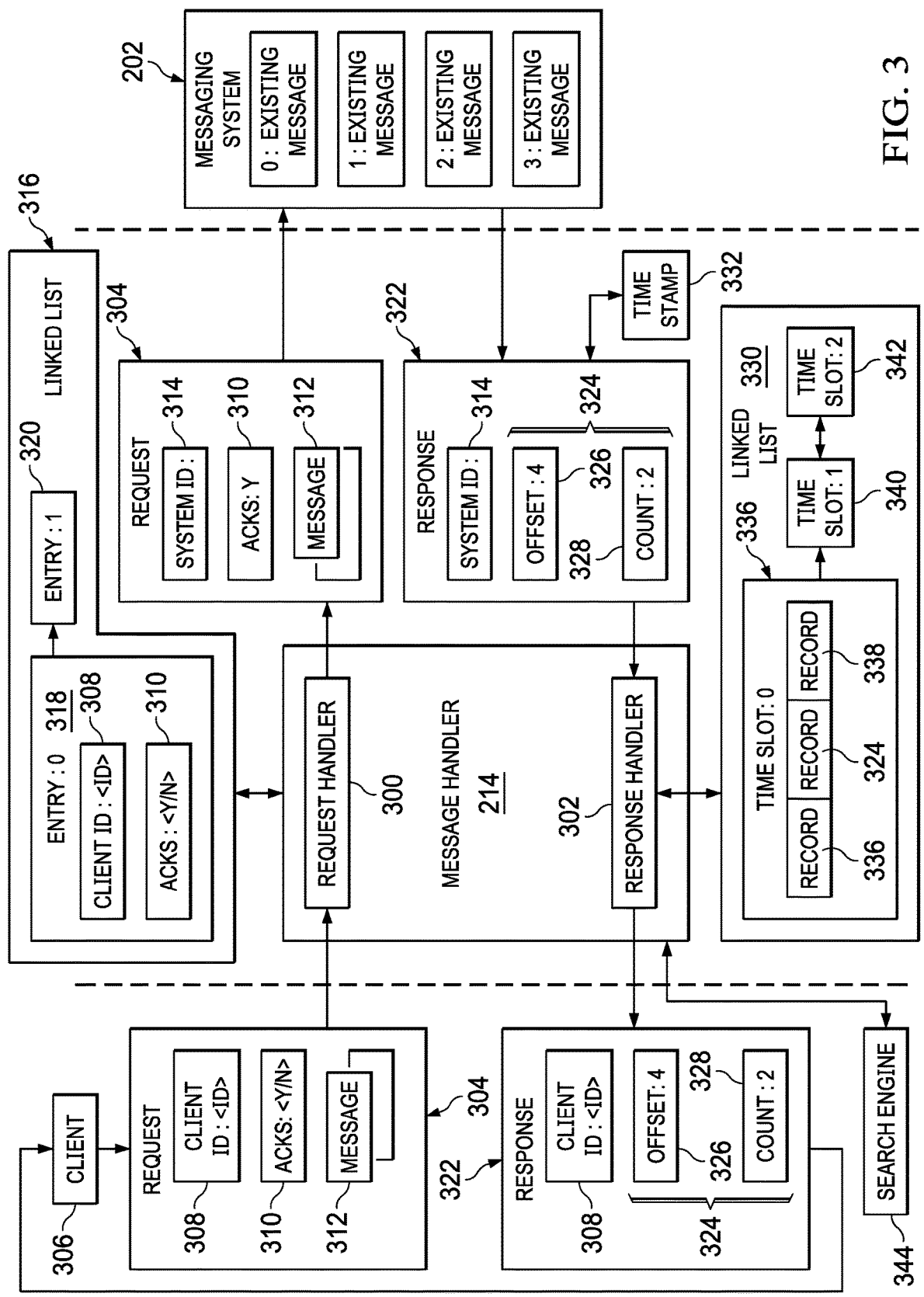
FIG. 3 is a data flow diagram illustrating processing of a request and a response in accordance with an illustrative embodiment.

Turning to FIG. 3, a data flow diagram illustrating a processing of a request and a response is depicted in accordance with an illustrative embodiment. In the illustrative examples, the same reference numeral may be used in more than one figure.

In this illustrative example, an example of components can be implemented in message handler 214, which is implemented as a proxy server in this depicted example. As depicted, message handler 214 comprises request handler 300 and response handler 302.

As depicted, request handler 300 in message handler 214 receives request 304 from client 306, wherein request 304 is intended for messaging system 202. As depicted, request 304 comprises client identifier 308, acknowledgment field 310, and messages 312. Client identifier 308 is an identifier used by client 306 to identify request 304. Acknowledgement field 310 indicates whether client 306 expects to receive a response. Messages 312 are the messages that client 306 wants to publish or make available for distribution by messaging system 202.

Request handler 300 replaces client identifier 308 with system identifier 314. System identifier 314 is used to identify linked list 316 and entry: 0 318 in linked list 316. In this illustrative example, entry: 0 318 stores client identifier 308 and the value of acknowledgment field 310. The information about a next request is stored in entry: 1 320. In this example, only two entries are shown in linked list 316. Linked list 316 can have any number of entries such as 255 entries, 512 entries, or some other number of entries.

As depicted, request handler 300 sends request 304 with system identifier 314 to messaging system 202. Messaging system 202 processes request 304 and returns response 322. In this illustrative example, response 322 is received by response handler 302 in message handler 214.

In this example, response 322 includes system identifier 314 and record 324. As depicted, record 324 includes offset 326 and count 328. Offset 326 identifies an offset in message system 202 where messages 312 are stored. Count 328 identifies a number of messages 312 at offset 326.

In this illustrative example, response handler 302 determines whether client 306 expects to receive response 322. This determination can be made by examining a value of acknowledgment field 310 in entry: 0 318. As depicted, this entry is found using system identifier 314 as an index to the entry.

When client 306 expects to receive response 322, response handler 302 replaces system identifier 314 with client identifier 308. Response handler 302 then sends response 322 back to client 306. If client 306 does not expect response 322, response 322 is dropped.

Further, response handler 302 places record 324 into a time slot in linked list 330. The time slot selected is based on time stamp 332 for record 324. Time stamp 332 can be determined in a number of different ways. For example, time stamp 332 can be included in response 322 by messaging system 202. With this example, time stamp 332 indicates when request 304 was processed by messaging system 202. In another example, time stamp 332 can be a time when response 322 is seen or received by response handler 302.

In the illustrative examples, time stamp 332 can be Unix time or UNIX Epoch time, which describes a point of time as the number of seconds that have elapsed since a coordinated universal time (UTC), starting Thursday, Jan. 1, 1970. Of course, other types of time stamps may be used depending on the particular implementation.

As depicted, record 324 is placed into time slot: 0 336. As depicted, time slot: 0 336 also includes record 336 and record 338. Record 336 and record 338 are considered adjacent records to record 324 in this example. This adjacency allows these records to be combined to form a compressed record.

Other time slots such as time slot: 1 340 and time slot: 2 342 are present in linked list 330. Although three time slots are shown for linked list 330, linked list 330 can include other numbers of time slots such as 150 time slots, 300 time slots, or some other suitable number of time slots.

As depicted, response handler 302 sends records from the time slot in linked list 330 to search engine 344. In this example, search engine 344 can process the records to generate message metrics. These message metrics can be displayed to a user for analysis and use in determining whether to make changes to messaging system 202. As depicted, the message metrics can include at least one of message throughput, memory use, processor use, or other metrics that indicate how well messages are processed by messaging system 202. Some other examples of message metrics include, for example, without limitation, the amount of data processed, the amount of data requested by the client, client usage patterns, or other metrics. The amount of data processed can be a size in bytes rather than a count of messages. In this example, client usage patterns can allow scaling of messaging system 202 in anticipation of a message burst based on client usage patterns.

Figure 4:
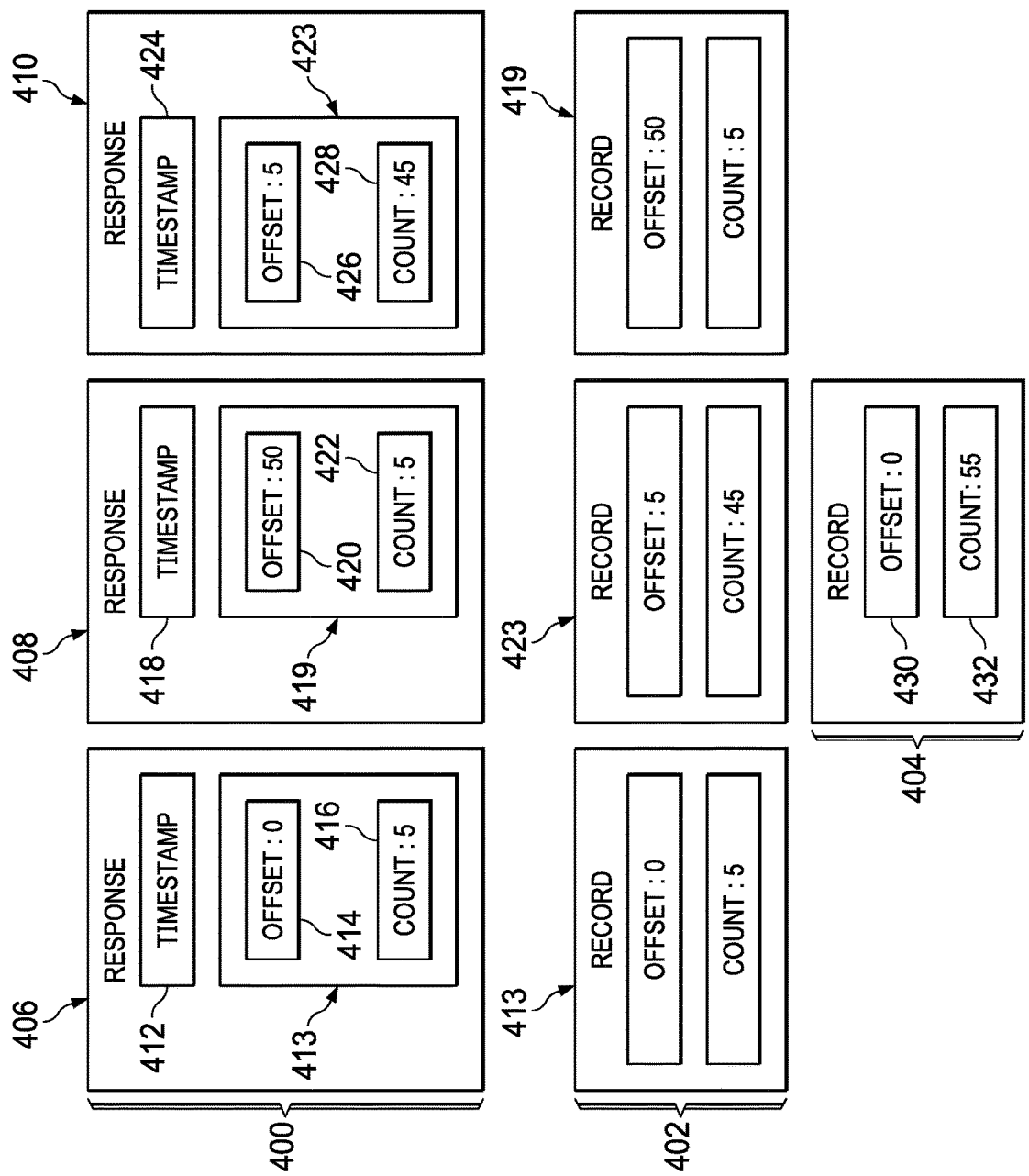
FIG. 4 is a block diagram illustrating the compression of records in accordance with an illustrative embodiment.

With reference now to FIG. 4, a block diagram illustrating the compression of records is depicted in accordance with an illustrative embodiment. In this example, received responses 400, ordered records 402, and compressed record 404 are illustrated. Received responses 400 are received in the order of response 406, response 408, and response 410. Response 406 comprises time stamp 412 and record 413 including offset 414 and count 416. Response 408 comprises time stamp 418 and record 419 including offset 420 and count 422. Response 410 comprises time stamp 424 and record 423 including offset 426 and count 428.

As depicted, time stamp 412, time stamp 418, and time stamp 424 all have the same value. As a result, all of these records are placed in the same time slot.

The records are placed in a time slot based on when they are received, therefore the order would be record 413, record 419, and record 423. However, these records are placed in the time slot based on the offsets in the records, which is not the order in which they are received.

In this illustrative example, offset 414 is 0 and count 416 is 5 in record 413; offset 420 is 50 and count 422 is 5 in record 419; and offset 426 is 5 and count 428 is 45 in record 423. The offsets indicate where messages stored for a particular record begin in a location in the messaging system. The counts indicate how many messages are present from the offset.

In this illustrative example, based on the offset and counts, the order of the records is record 413, record 419, and record 423. As depicted, record 413 and record 423 are located on either side of record 419 in the time slot and have ranges that are adjacent to the range for record 419. As a result, these records can be combined to form record 404 with offset 430 and count 432. As depicted, offset 430 is in record 413. Count 432 is 55 which is the combined count of all the messages in record 413, record 419, and record 423.

In this manner, fewer records can be sent to a remote computer system for processing. As a result, in addition to not sending the actual messages, fewer records also result in increased performance in processing records generated by message handler 214.

Figure 5:
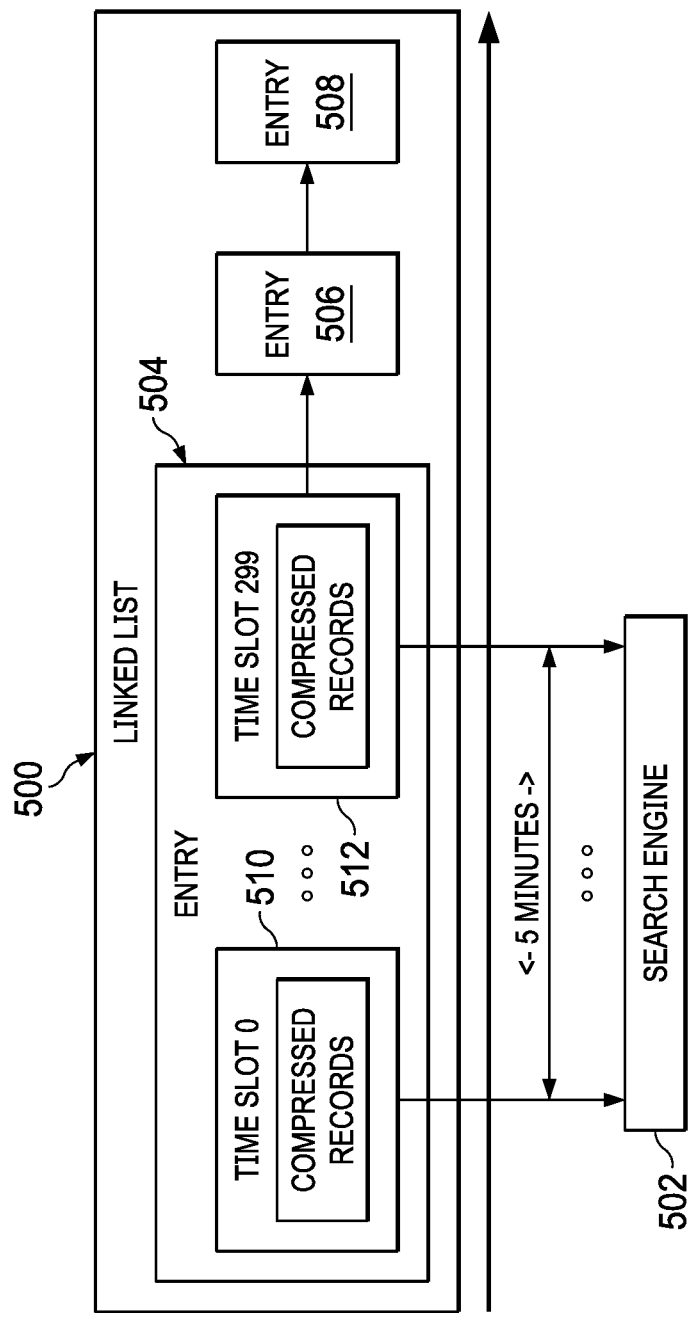
FIG. 5 is a block diagram illustrating sending records for processing in accordance with an illustrative embodiment.

With reference now to FIG. 5, a block diagram illustrating sending records for processing is depicted in accordance with an illustrative embodiment. As depicted, linked list 500 comprises entries for storing records that are to be sent to search engine 502.

In this example, linked list 500 includes entry 504, entry 506, and entry 508. Each of these entries includes 300 time slots, time slot: 0 510 through time slot: 299 512. As depicted, with 300 time slots, entry 504 stores five minutes of information with respect to message processing in compressed records.

In a similar fashion, entry 506 and entry 508 each also include 300 time slots. In this illustrative example, the message handler sends compressed records from a time slot every second. Depending on the particular implementation, this time period can be some other value such as one millisecond, one nanosecond, three nanoseconds, or some other suitable time period. In other illustrative examples, the linked list may contain other numbers of entries such as 256, 500, or some other suitable number of entries.

Figure 6:
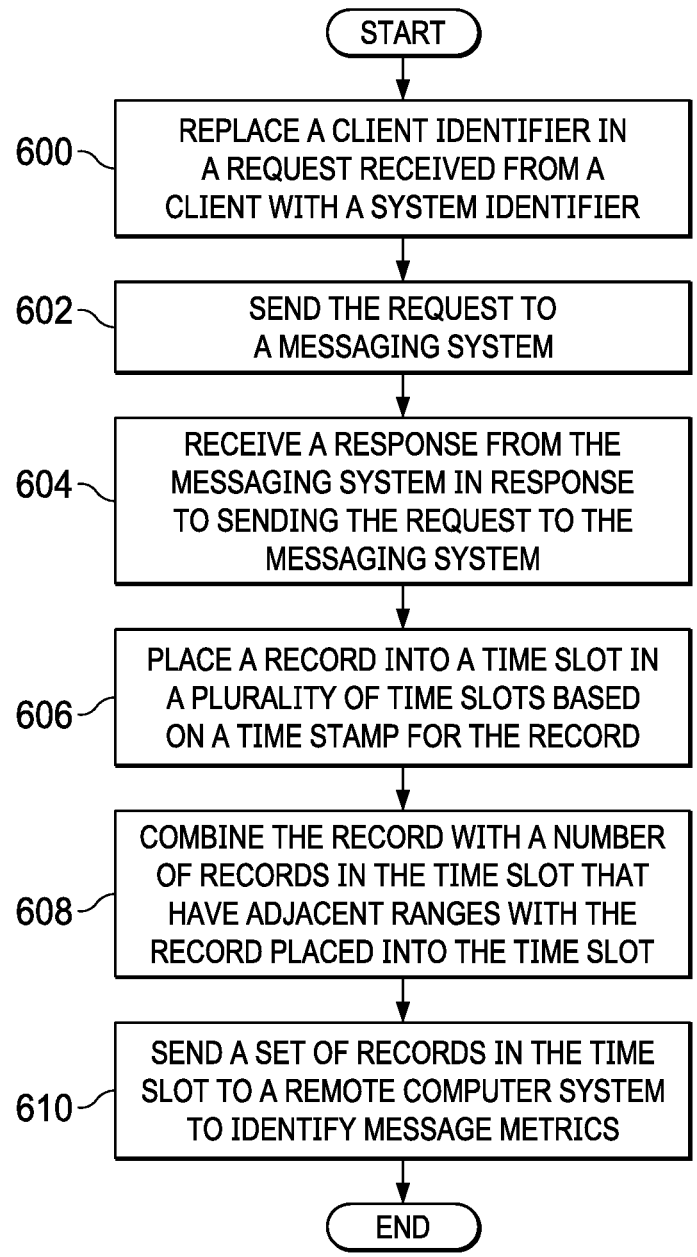
FIG. 6 is a flowchart of a process for processing messages for a messaging system in accordance with an illustrative embodiment.

Turning next to FIG. 6, a flowchart of a process for processing messages for a messaging system is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by replacing a client identifier in a request received from a client with a system identifier (step 600). The process sends the request to a messaging system (step 602). The process receives a response from the messaging system in response to sending the request to the messaging system (step 604). The response comprises the system identifier and a record identifying a location and a number of messages at the location. The process places a record into a time slot in a plurality of time slots based on a time stamp for the record (step 606). The process combines the record with a number of records in the time slot that have adjacent ranges with the record placed into the time slot (step 608).

The process sends a set of records in the time slot to a remote computer system to identify message metrics (step 610). The process terminates thereafter. The combining of the records compresses the records. This compressing of the records enables reducing processing resources used to process the records to identify the message metrics.

Figure 7:
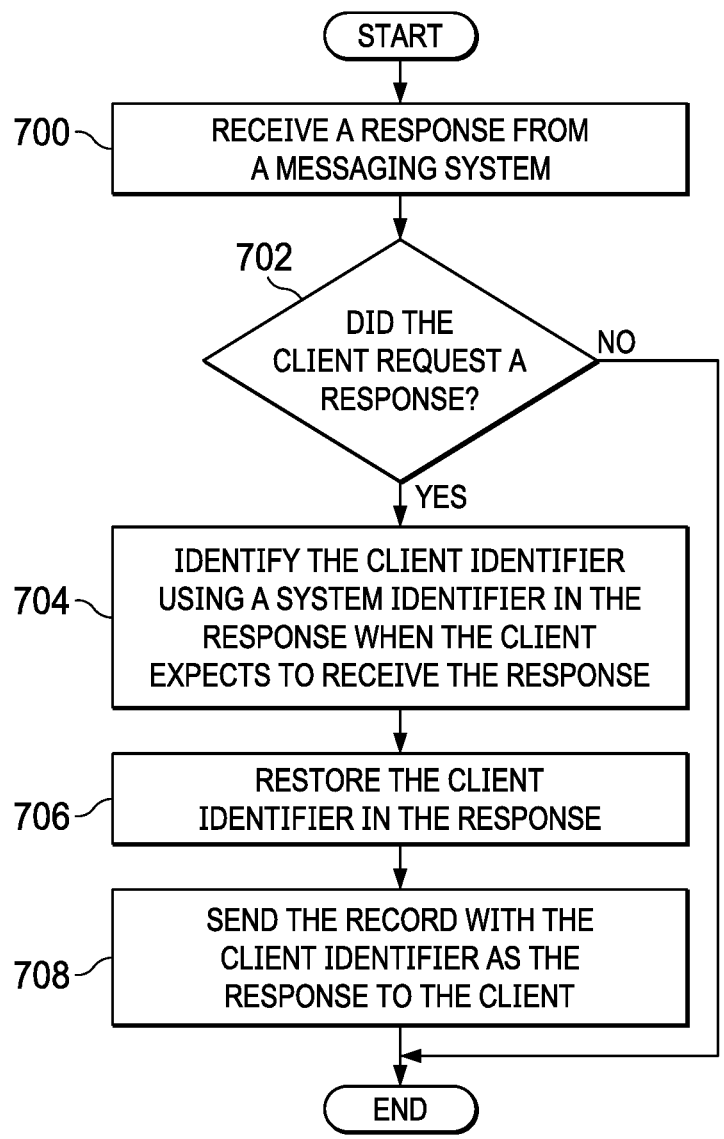
FIG. 7 is a flowchart of a process for selectively returning a response to a client in accordance with an illustrative embodiment.

With reference next to FIG. 7, a flowchart of a process for selectively returning a response to a client is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by receiving a response from a messaging system (step 700). The process determines whether the client requested a response (step 702). The determination in step 702 can be made by checking a data structure such as data structure 229 in FIG. 2 in which the client identifier and an indication of whether a response was requested is stored in association with a system identifier. The system identifier can be used as an index to locate the client identifier and the indication of whether a response was requested. If the client requested a response, the process identifies the client identifier using a system identifier in the response when the client expects to receive the response (step 704). The process restores the client identifier in the response (step 706). The process sends the record with the client identifier as the response to the client (step 708). The process terminates thereafter. With reference again to step 702, if the client did not request a response, the process terminates.

Figure 8:
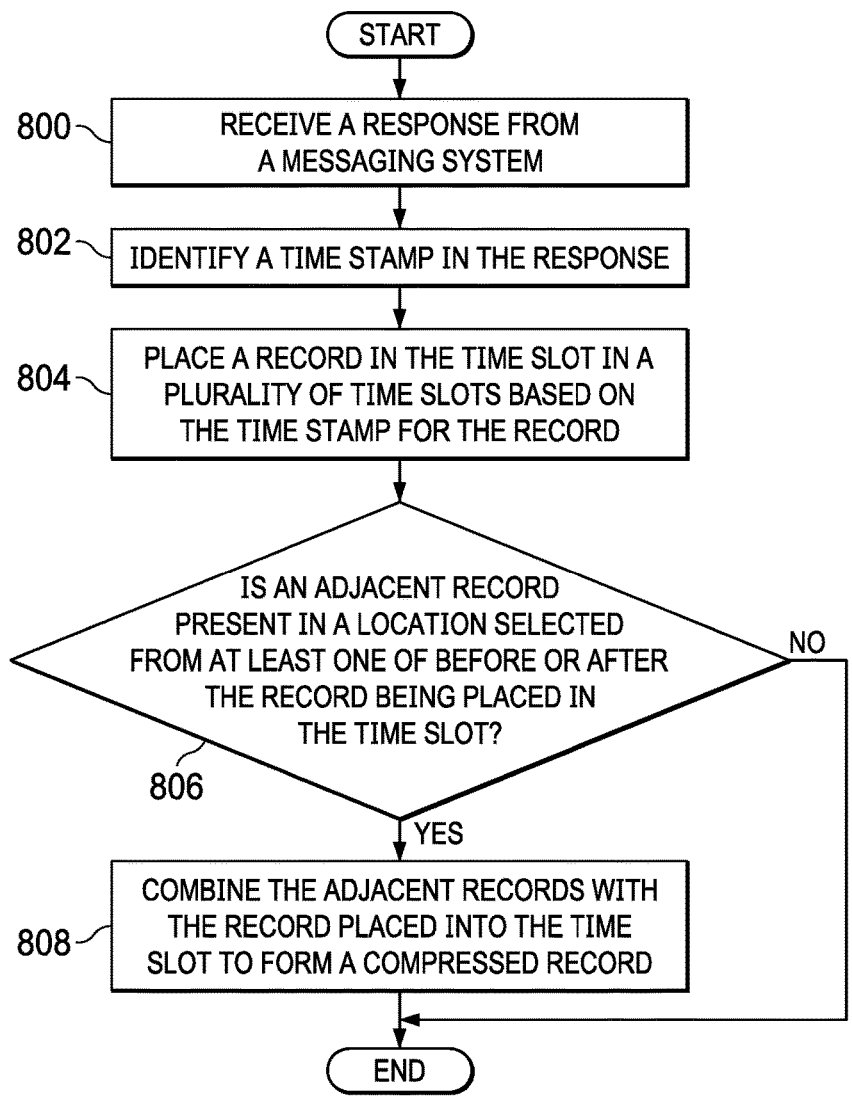
FIG. 8 is a flowchart of a process for processing records in accordance with an illustrative embodiment.

With reference next to FIG. 8, a flowchart of a process for processing records is depicted in accordance with an illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by receiving a response from a messaging system (step 800). The process identifies a time stamp in the response (step 802). The process places a record in the time slot in a plurality of time slots based on the time stamp for the record (step 804). The process determines whether an adjacent record is present in a location selected from at least one of before or after the record being placed in the time slot (step 806). If one or more adjacent records are present, the process combines the adjacent records with the record placed into the time slot to form a compressed record (step 808). The process terminates thereafter. With reference again to step 806, if one or more adjacent records are not present, the process terminates.

This process can be run each time a record is placed into a time slot. The process combines adjacent records to compress the amount of data that is send to a remote computer system for processing. In this manner the amount of resources used to process records about messages in a messaging system are reduced.

Figure 9:
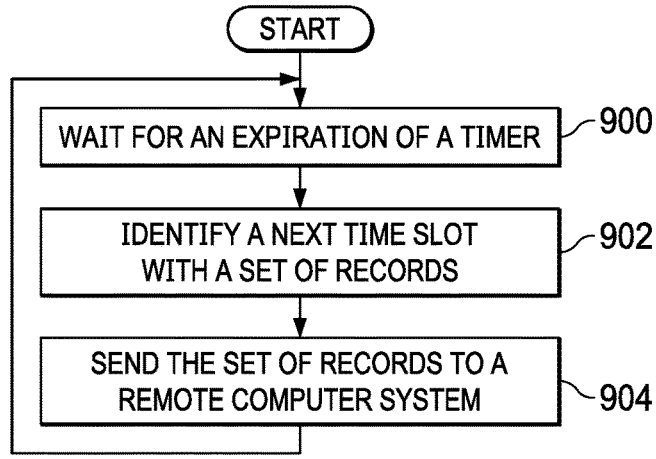
FIG. 9 is a flowchart of a process for sending records to processing records in accordance with an illustrative embodiment.

With reference next to FIG. 9, a flowchart of a process for sending records to processing records is depicted in accordance with an illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by waiting for an expiration of a timer (step 900). The timer period for the timer can be selected based on how often records are to be sent to a remote computer system for processing. For example, the timer can be one second, one millisecond, one nanosecond, three nanoseconds, or some other period of time.

When the timer expires, the process identifies a next time slot with a set of records (step 902). The process sends the set of records to a remote computer system (step 904). The process then returns to step 900.

The remote computer system processes records that are sent to identify message metrics. These message metrics can be displayed to a user. The user can make changes to the messaging system if desired to increase the performance of the messaging system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
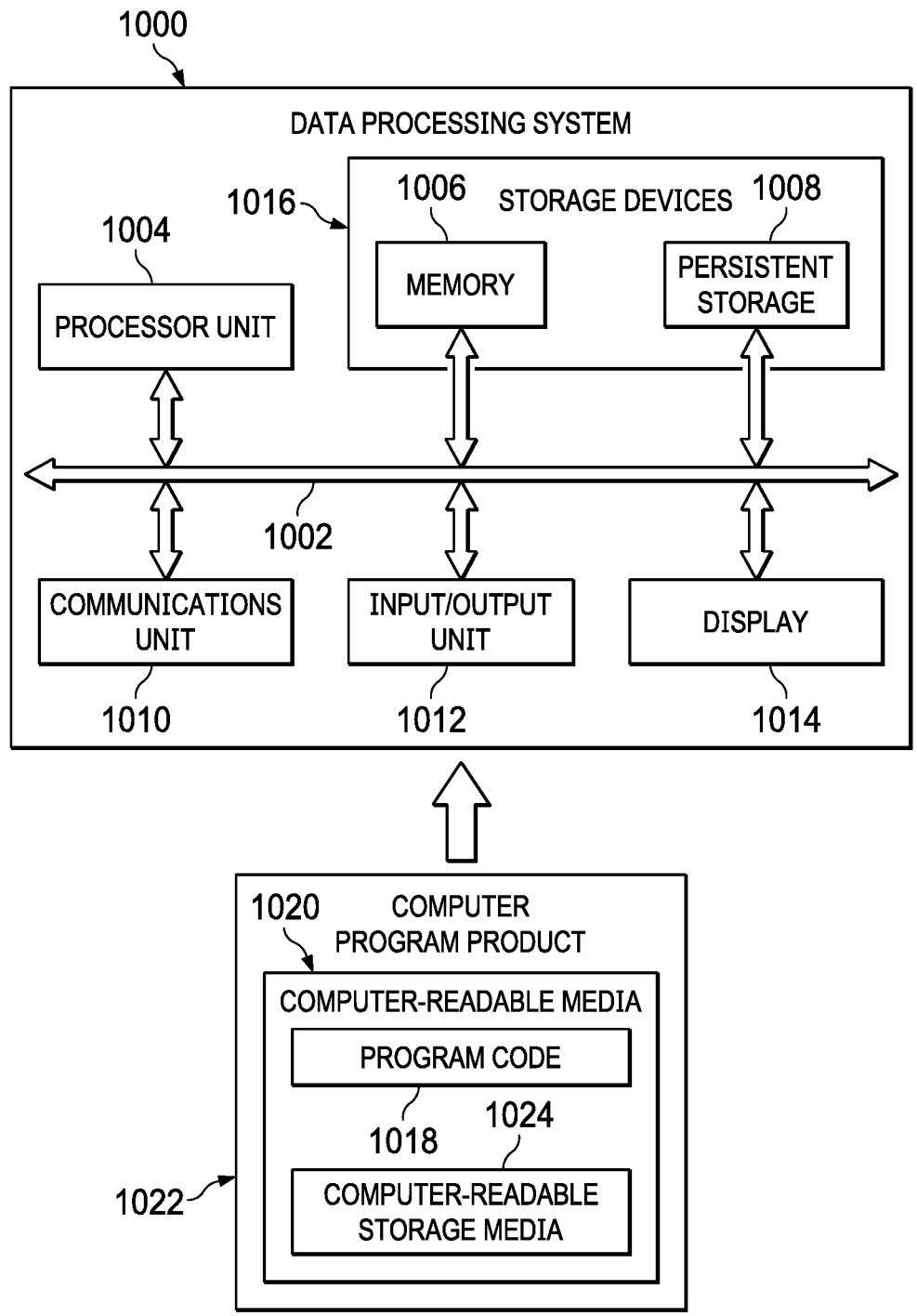
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 212 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 include one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and run by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for processing by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, the 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative embodiments of the present invention provide a computer implemented method, computer system, and computer program product for processing messages for a messaging system. A client identifier in a request received from a client is replaced by a computer system with a system identifier. The request is sent to the messaging system by the computer system. A record is received by the computer system from the messaging system in response to sending the request to the messaging system. The record comprises a result and a time stamp. The record is placed into a time slot in a plurality of time slots by the computer system based on the time stamp for the record. The record is combined by the computer system with a number of records in the time slot that have adjacent ranges with the record placed into the time slot. A set of records in the time slot is sent by the computer system to a remote computer system to identify message metrics. Compressing the records enables reducing processing resources used to process the records to identify the message metrics.

One or more technical solutions are present in the different illustrative examples that overcome a technical problem with monitoring processing of message in a messaging system. As a result, one or more technical solutions may provide a technical effect reducing the amount of data processed to determine message metrics for the processing of messages in a messaging system. In an illustrative example, records are sent to the analysis system instead of the messages. The records use less network resources to transmit over a network and less processor resources in an analysis system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for processing messages for a messaging system, the method comprising:
    replacing, by a computer system, a client identifier in a request received from a client with a system identifier;
    determining, by the computer system, whether the client expects to receive a response based on the request;
    sending, by the computer system, the request to the messaging system, wherein the computer system alters the request sent to the messaging system to cause the response to be generated by the messaging system when an absence of the response being requested by the client in the request;
    receiving, by the computer system, the response from the messaging system in response to sending the request to the messaging system, wherein the response comprises the system identifier and a record identifying a location and a number of messages at the location;
    suppressing, by the computer system, sending of the response to the client when the response is received from the messaging system in response to the absence of the response being requested by the client in the request;
    placing, by the computer system, the record into a time slot in a plurality of time slots based on a time stamp for the record;
    combining, by the computer system, the record with a number of records in the time slot that have adjacent ranges with the record placed into the time slot; and
    sending, by the computer system, a set of records in the time slot to an analysis system to identify message metrics.

2. The method of claim 1 further comprising:
    storing, by the computer system, the system identifier in association with the client identifier in a data structure.

3. The method of claim 1 further comprising:
    identifying, by the computer system, the client identifier using the system identifier in the response when the client expects to receive the response;
    restoring, by the computer system, the client identifier in the response; and
    sending, by the computer system, the response with the client identifier and the record to the client.

4. The method of claim 1, wherein the plurality of time slots is located in an entry in a linked list of entries.

5. The method of claim 1, wherein the location comprises an offset to the location where the number of messages from the request is stored by the messaging system and a count identifying the number of messages stored.

6. The method of claim 5, wherein the record further comprises at least one of a topic or a partition used to locate the number of messages stored by the messaging system.

7. The method of claim 1, wherein the computer system is a proxy server for the messaging system.

8. A message processing system comprising:
    a computer system, wherein the computer system replaces a client identifier in a request received from a client with a system identifier; determines whether the client expects to receive a response based on the request sends the request to a messaging system, wherein the computer system alters the request sent to the messaging system to cause the response to be generated by the messaging system when an absence of the response being requested by the client in the request; receives the response from the messaging system in response to sending the request to the messaging system, wherein the response comprises the system identifier and a record identifying a location and a number of messages at the location; suppresses sending of the response to the client when the response is received from the messaging system in response to the absence of the response being requested by the client in the request places the record into a time slot in a plurality of time slots based on a time stamp for the record; combines the record with a number of records in the time slot that have adjacent ranges with the record placed into the time slot; and sends a set of records in the time slot to an analysis system to identify message metrics.

9. The message processing system of claim 8, wherein the computer system stores the system identifier in association with the client identifier in a data structure.

10. The message processing system of claim 8, wherein the computer system identifies the client identifier using the system identifier in the response when the client expects to receive the response; restores the client identifier in the response; and sends the response with the client identifier and the record to the client.

11. The message processing system of claim 8, wherein the plurality of time slots is located in an entry in a linked list of entries.

12. The message processing system of claim 8, wherein the location comprises an offset to the location where the number of messages from the request is stored by the messaging system and a count identifying the number of messages stored.

13. The message processing system of claim 12, wherein the record further comprises at least one of a topic or a partition used to locate the number of messages stored by the messaging system.

14. The message processing system of claim 8, wherein the computer system is a proxy server for the messaging system.

15. A computer program product for processing messages for a messaging system, the computer program product comprising:
a computer-readable storage media;
first program code, stored on the computer-readable storage media, for replacing a client identifier in a request received from a client with a system identifier;
second program code, stored on the computer-readable storage media, for determining whether the client expects to receive a response based on the request;
third program code, stored on the computer-readable storage media, for sending the request to the messaging system, wherein the request sent to the messaging system is altered to cause the response to be generated by the messaging system when an absence of the response being requested by the client in the request;
fourth program code, stored on the computer-readable storage media, for receiving the response from the messaging system in response to sending the request to the messaging system, wherein the response comprises the system identifier and a record identifying a location and a number of messages at the location;
fifth program code, stored on the computer-readable storage media, for suppressing sending of the response to the client when the response is received from the messaging system in response to the absence of the response being requested by the client in the request;
sixth program code, stored on the computer-readable storage media, for placing the record into a time slot in a plurality of time slots based on a time stamp for the record; and
seventh program code, stored on the computer-readable storage media, for combining the record with a number of records in the time slot that have adjacent ranges with the record placed into the time slot to form a compressed record, wherein the compressed record is analyzed to identify message metrics.

16. The computer program product of claim 15 further comprising:
eighth program code, stored on the computer-readable storage media, for storing the system identifier in association with the client identifier in a data structure.

17. The computer program product of claim 15 further comprising:
ninth program code, stored on the computer-readable storage media, for identifying the client identifier using the system identifier in the response when the client expects to receive the response;
tenth program code, stored on the computer-readable storage media, for restoring the client identifier in the response; and
eleventh program code, stored on the computer-readable storage media, for sending the response with the client identifier and the record to the client.

* * * * *